(12) United States Patent
Follin et al.

(10) Patent No.: US 6,760,689 B2
(45) Date of Patent: Jul. 6, 2004

(54) SYSTEM AND METHOD FOR PROCESSING DATA OBTAINED FROM TURBINE OPERATIONS

(75) Inventors: Gordon J Follin, Powder Springs, GA (US); Eric J. Kauffman, Marietta, GA (US)

(73) Assignee: General Electric Co., Schnectady, NY (US)

( * ) Notice: Subject to any disclaimer, the term of this patent is extended or adjusted under 35 U.S.C. 154(b) by 168 days.

(21) Appl. No.: 10/035,338

(22) Filed: Jan. 4, 2002

(65) Prior Publication Data

US 2003/0163288 A1 Aug. 28, 2003

(51) Int. Cl.⁷ .............................................. G06F 11/00
(52) U.S. Cl. ...................................... 702/188; 701/100
(58) Field of Search .................. 702/188, 84; 701/100, 701/14; 700/290; 703/2; 706/45

(56) References Cited

U.S. PATENT DOCUMENTS

| | | | |
|---|---|---|---|
| 3,731,070 A | | 5/1973 | Urban |
| 3,937,934 A | * | 2/1976 | Pasemann ................... 700/290 |
| 4,215,412 A | * | 7/1980 | Bernier et al. .............. 701/100 |
| 4,621,335 A | | 11/1986 | Bluish et al. |
| 4,785,403 A | * | 11/1988 | Kuhlberg ..................... 701/14 |
| 4,992,946 A | | 2/1991 | Butz et al. |
| 5,067,099 A | | 11/1991 | McCown et al. |
| 5,249,260 A | * | 9/1993 | Nigawara et al. ............. 706/45 |
| 5,311,422 A | * | 5/1994 | Loftin et al. .................... 703/2 |
| 5,532,941 A | * | 7/1996 | Lin .............................. 702/84 |
| 5,748,500 A | | 5/1998 | Quentin et al. |
| 6,138,081 A | | 10/2000 | Olejack et al. |
| 6,157,310 A | | 12/2000 | Milne et al. |
| 6,262,550 B1 | | 7/2001 | Kliman et al. |
| 6,263,265 B1 | | 7/2001 | Fera |
| 6,338,152 B1 | | 1/2002 | Fera et al. |
| 6,343,251 B1 | * | 1/2002 | Herron et al. .............. 701/100 |
| 6,556,956 B1 | * | 4/2003 | Hunt .......................... 702/188 |

OTHER PUBLICATIONS

U.S. patent application 09/749,303 and the references cited therein. (Chan, Jeffrey, et al. and System for Analyzing Performance of a Turbine. Dec. 27, 2000.

* cited by examiner

*Primary Examiner*—John Bartow
*Assistant Examiner*—Xiuqin Sun
(74) *Attorney, Agent, or Firm*—Hunton & Williams LLP

(57) ABSTRACT

The system and method of the invention provide for remotely monitoring the operation of at least one turbine, the turbine being disposed in an operating location. The method comprises inputting input data from the turbine; and processing the input data to generate verified performance data, the processing including determining validity of the input data and performing at least one calculation on the input data, which is valid, to generate the verified performance data. The method further includes generating a collection of stored data in a database based on at least one of the input data and the verified performance data.

21 Claims, 4 Drawing Sheets

SYSTEM AND METHOD FOR PROCESSING DATA OBTAINED FROM TURBINE OPERATIONS

BACKGROUND OF THE INVENTION

The invention relates to systems and methods for inputting and processing data obtained from a turbine or a number of turbines.

In conjunction with the operation of a turbine, and in particular a gas turbine, various performance tests are conducted throughout the life of a turbine. These tests might include tests performed at the time the turbine is commissioned, as well as tests that are performed periodically in the life of the turbine. Further, the performance tests are typically performed at the turbine site, using known techniques currently utilized.

Such on site testing requires travel by testing experts to the site of the turbine, shipment of expensive instrumentation, and operation of the turbine within specified parameters for extended periods of time. This can be expensive and inconvenient, especially in the situation where only a particular type of data, such as trend data, is desired. Further, the operation of a gas turbine within a specified period of time for testing purposes can be burdensome. Additionally, performance testing at the site only provides a snapshot of gas turbine performance at the time the test was performed. While valuable, this type of information does not allow for the diagnosis of operational issues of a gas turbine or the variation of gas turbine performance over time.

The system and method of the invention address these as well as other problems with conventional techniques used to monitor turbine performance.

BRIEF SUMMARY OF THE INVENTION

A system and method are provided for monitoring the operation of a turbine or turbines in respective operating locations. In accordance with one embodiment of the invention, a method provides for remotely monitoring the operation of at least one turbine, the turbine being disposed in an operating location. The method comprises inputting input data from the turbine; and processing the input data to generate verified performance data, the processing including determining validity of the input data and performing at least one calculation on the input data, which is valid, to generate the verified performance data. The method further includes generating a collection of stored data in a database based on at least one of the input data and the verified performance data.

In accordance with a further aspect, the invention provides a system for remotely monitoring the operation of at least one turbine, the turbine in an operating location, the system comprising: a database for inputting input data from the turbine; a processing system that processes the input data to generate verified performance data, the processing system including: a data validation portion that determines validity of the input data; a calculation engine that performs at least one calculation on the input data, which is valid, to generate the verified performance data; and a presentation portion that accesses a data storage portion to display a collection of stored data that is stored in the data storage portion, wherein the stored data is based on at least one of the input data and the verified performance data.

In accordance with a further aspect, the invention provides a system for remotely monitoring the operation of at least one turbine, the turbine in an operating location, the system comprising: means for inputting input data from the turbine; means for processing the input data to generate verified performance data, the means for processing determining validity of the input data and performing at least one calculation on the input data, which is valid, to generate the verified performance data; and means for generating a collection of stored data in a database based on at least one of the input data and the verified performance data.

In accordance with a further aspect, the invention provides a method for remotely monitoring the operation of at least one gas turbine, the gas turbine in an operating location, the method comprising: inputting input data from the gas turbine; processing the input data to generate verified performance data, the processing including determining validity of the input data and performing at least one calculation on the input data, which is valid, to generate the verified performance data; and generating a collection of stored data in a database based on at least one of the input data and the verified performance data; and wherein determining the validity of the calculated performance data includes determining a base load condition of the turbine; wherein determining the validity of the calculated performance data includes determining a steady state condition of the turbine; wherein the step of processing the input data to generate verified performance data includes stopping the processing once input data or processed data, which is obtained from the input data, is determined to be invalid; and generating a collection of stored data includes displaying at least one of the input data and the verified performance data that is obtained prior to the stopping; and wherein the processing the input data to generate verified performance data further includes: determining an invalidity of a first utilized calculation; determining the validity of a second utilized calculation; and using the second calculation in substitution for the first utilized calculation to generate the verified performance data.

In accordance with a further aspect, the invention provides an automated system for remotely monitoring the operation of at least one gas turbine, the gas turbine in an operating location, the system comprising: a database for inputting input data from the turbine; a processing system that processes the input data to generate verified performance data, the processing system including: a data validation portion that determines validity of the input data, the data validation portion performs at least one of range checks and cross comparisons on the input data; a calculation engine that performs at least one calculation on the input data, which is valid, to generate the verified performance data; and a presentation portion that accesses a data storage portion to display a collection of stored data that is stored in the data storage portion, wherein the stored data is based on at least one of the input data and the verified performance data; and wherein the processing system stops processing once the input data or processed data, which is obtained from the input data, is determined to be invalid; and the presentation portion displays at least one of the input data and the verified performance data that is obtained prior to the stopping; and wherein the processing portion: determines an invalidity of a first utilized calculation; determines the validity of a second utilized calculation; and wherein the calculation engine uses the second calculation in substitution for the first utilized calculation to generate the verified performance data.

In accordance with a yet further aspect, the invention provides a system for remotely monitoring the operation of at least one gas turbine, the gas turbine in an operating location, the system comprising: means for inputting input data from the gas turbine; means for processing the input data to generate verified performance data, the means for processing determining validity of the input data and performing at least one calculation on the input data, which is valid, to generate the verified performance data; and means for generating a collection of stored data in a database based on at least one of the input data and the verified performance data; and wherein the means for determining the validity of the calculated performance data determines a base load condition of the turbine; wherein the means for determining the validity of the calculated performance data determines a steady state condition of the turbine; wherein the means for processing the input data to generate verified performance data stops the processing once input data or processed data, which is obtained from the input data, is determined to be invalid; and the means for generating a collection of stored data displays at least one of the input data and the verified performance data that is obtained prior to the stopping; and wherein the means for processing the input data to generate verified performance data: determines an invalidity of a first utilized calculation; determines the validity of a second utilized calculation; and uses the second calculation in substitution for the first utilized calculation to generate the verified performance data.

BRIEF DESCRIPTION OF THE DRAWINGS

The present invention can be more fully understood by reading the following detailed description together with the accompanying drawings, in which like reference indicators are used to designate like elements, and in which.

DETAILED DESCRIPTION OF THE INVENTION

Figure 1:
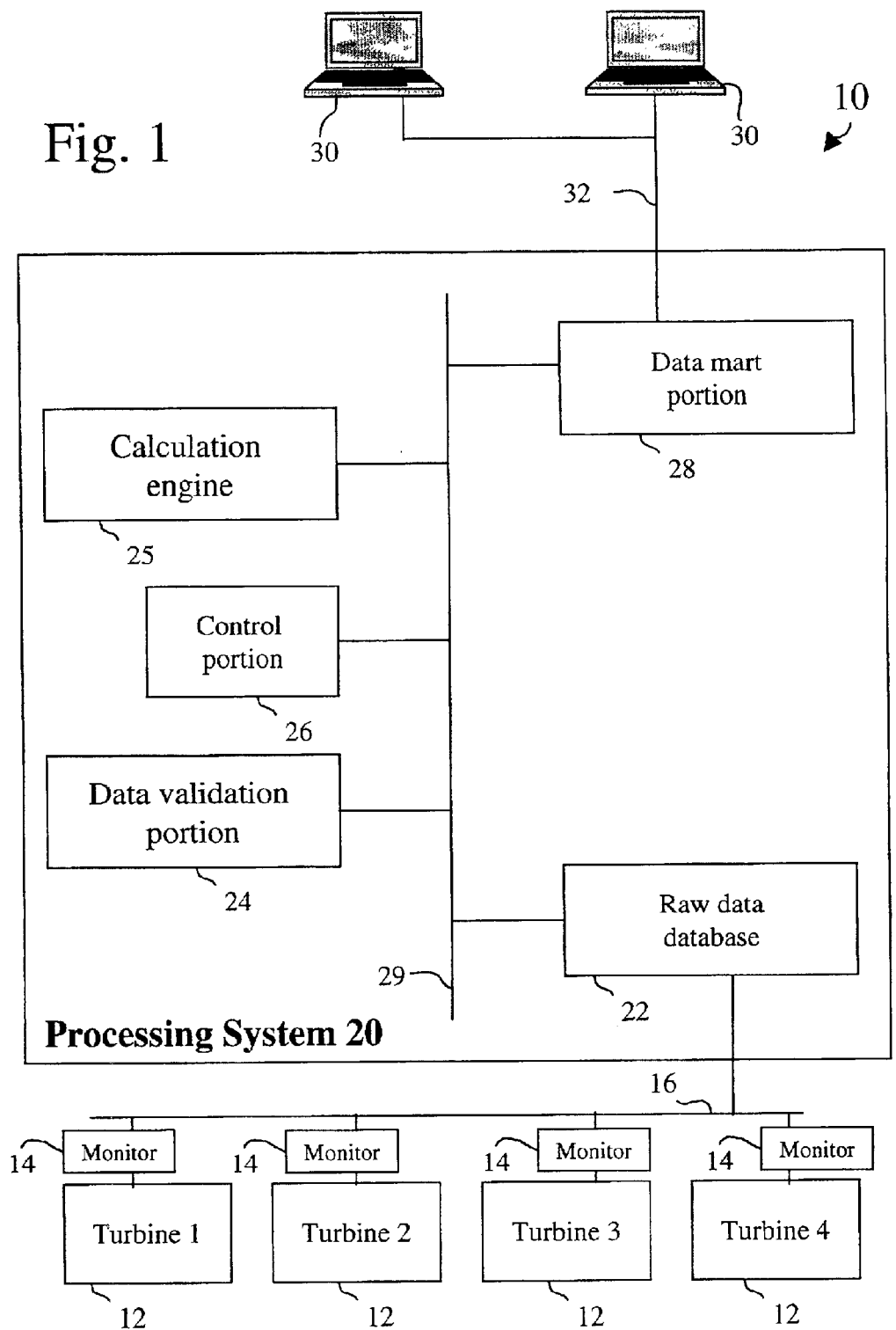
FIG. 1 is a block diagram showing a turbine monitoring system in accordance with one embodiment of the invention.

Hereinafter, aspects of the system and method for monitoring the operation of a turbine or a number of turbines in accordance with various embodiments of the invention will be described. As used herein, any term in the singular may be interpreted to be in the plural, and alternatively, any term in the plural may be interpreted to be in the singular.

The foregoing description of various products, methods, or apparatus and their attendant disadvantages is in no way intended to limit the scope of the present invention, or to imply that the present invention does not include some or all of the various elements of the products, methods, and apparatus in one form or another. Indeed, various embodiments of the invention may be capable of overcoming some of the disadvantages noted herein, while still retaining some or all of the various elements of the products, methods, and apparatus in one form or another.

The system and method of the invention provide for the collection of data, including trend data for example, comparable to obtaining the data on site. In accordance with one embodiment, the invention periodically queries and stores multiple data signals from a turbine controller, using an on site monitor (OSM). It is through the examination of these signals that the performance data may be obtained and used in an automated manner.

In accordance with one embodiment of the invention, a method evaluates centrally stored data regarding a turbine or a number of turbines on a nightly basis. Illustratively, the data is extracted in such a fashion as to yield five-minute interpolated data sets, for example. However, as should be appreciated, other intervals may be used as desired. Various processing is performed on the input data including processing by a calculation engine, such as performing heat balance iterations, for example, i.e., performing calculations to compare the energy into the turbine with the energy out of the turbine using an efficiency multiplier. Upon completion of processing, the processed data may be stored in a separate database also at five-minute intervals, for example.

The system and method of the invention may be used to determine if the turbine is operating at base load or steady state. That is, in order to determine if the gas turbine is operating at base load and/or steady state conditions, the input data may be given an additional set of checks. The data sets are then marked to indicate if the base load and steady state criteria were met . Where a complete set of data for a day has a sufficient number of output data points determined to be during steady-state, base-load operation, a daily average may be calculated and stored in the database.

The system of the invention may be characterized, in accordance with one embodiment of the invention, as possessing three pieces of architecture. These pieces may reside on one single computer or on multiple computers in any suitable arrangement. The pieces of architecture include a raw data storage portion, a data calculation or processing portion, and a post-processed data storage portion. Measurements of a particular turbine may be collected from a control system, used to control the turbine, remotely from the turbine site using a suitable computer link.

In accordance with one embodiment of the invention, this collected data is then stored at a central location where the collected data can be accessed for analysis. Data validation in the form of range checks and cross checks is performed on the data to make various determinations. These determinations might include if the data is available, i.e., non-null; if the data has a reasonable value based on minimum and maximum expected levels; and/or if the data violates any physical laws. The validated data is then passed on to the performance calculation engine and output performance data is generated. This output performance data may also be validated by evaluating "goodness-of-fit" parameters, which indicate if a converged solution is reliable. In accordance with one embodiment of the invention, the invalid data is not stored in the database. All validated output data is evaluated and flagged if it meets certain criteria such as base load operation, steady state operation, unit on/off, startup, online or offline water wash, for example. These operations, as well as the other operations in accordance with various embodiments of the invention, may be done in an automated manner.

In accordance with one embodiment of the system and method of the invention, FIG. 1 is a block diagram showing a turbine monitoring system 10. The turbine monitoring system 10 includes various components as described below. However, it should be appreciated that the various components of the turbine monitoring system 10 can be on one single computer or on multiple computers in any arrangement. Accordingly, the processing performed by a single component, as shown in FIG. 1, might instead be performed by multiple components in different geographic locations. Further, the processing performed by two of the components, as shown in FIG. 1, might instead be performed by a single component.

As shown in FIG. 1, the turbine monitoring system 10 includes various operational components. These operational components include a plurality of turbines 12, i.e., a "fleet" of turbines; a processing system 20; and a data presentation portion or portions 30. The presentation portions 30 may provide, for example, a direct online customer sales interface to the data generated by the processing system 20, in accordance with one embodiment of the invention.

As shown in FIG. 1, the processing system 20 may be connected to the turbines 12 using a suitable network interface 16. For example, the Internet may be used. As shown in FIG. 1, each of the turbines 12 is associated with a monitor 14. For example, the monitor 14 for a particular turbine might form a part of a controller for the turbine. The monitor 14 for each turbine monitors operations in the turbine 12. The monitor 14 may include various components to collect and transmit data to the processing system 20. The processing system 20 may be disposed in a geographically remote location from a turbine 12.

As described above, the turbine monitoring system 10 also includes at least one data presentation portion. The processing system 20 may be connected to the data presentation portion or portions 30 using a suitable network interface 32. The network interface 32 may be the same or different from the interface 16.

The processing system 20 includes various operational components. Specifically, the processing system 20 includes processing portions comprising a data validation portion 24, a control portion 26, and a calculation engine 25. Further, the processing system 20 includes memory portions in accordance with one embodiment of the invention, as shown in FIG. 1. That is, the processing system 20 includes a raw data database 22 and a data mart portion 28. The raw data database 22 obtains data from the various monitors 14. At a time as desired, this data in the raw data database 22 is processed by the processing portions (24,25). Thereafter, the processed data is output to the data mart portion 28, or any other suitable data storage portion. The processed data may be retrieved from the data mart portion 28 as desired.

The processing system 20 includes a control portion 26. The control portion 26 controls the overall operations of the processing system 20 and performs tasks not performed by the other components. For example, the control portion 26 might control a user adjusting the manner in which data is processed in the processing system 20, i.e., such as a user or administrator changing threshold values. Thus, the control portion 26 might utilize a suitable user interface to communicate with a user. The various components of the processing system 20 may communicate in any suitable manner, such as via an interface 29.

The turbines 12 generate a variety of input data, i.e., operation data, that is output to the raw data database 22 in the processing system 20 utilizing the network interface 16, or in any other suitable manner. This data output by the turbines may be "raw" data, i.e., data that has not been processed in any substantial way other than transmission. The input data may include, for example, turbine power output, turbine rotational speed, and turbine load attributes, as described further below.

It should be appreciated that any of a wide variety of components and technology may be used to prepare the data at the respective turbines 12 and forward the data to the raw data database 22. For example, extra processors may be needed at the turbines 12 or in the processing system 20 in order to handle the volume of data collected from the turbines.

Once the data is received in the raw data database 22, the data may be immediately processed by the processing portions (24, 25) so as to be immediately displayed by the data presentation portion 30, in accordance with one embodiment of the invention. Alternatively, the data that is input by the raw data database 22 may be placed into the raw data database 22 for processing at some later time. In accordance with one embodiment of the invention, the raw data database 22 houses sufficient data for a particular period in question. Illustratively, the data period may be one day or 24 hours. For example, an entire data set may be analyzed at 1-minute intervals and an assessment performed by the processing system 20 as to whether the turbine is running or not, for example.

Once the data processing portions (24, 25) process the data that is input to the raw data database 22, the processing portions (24, 25) output the post processed data to the data mart portion 28. The data in the data mart portion 28 is then available for use by the processing system 20, as is desired. Alternatively, or in addition to, the processing system 20 may output the processed data to a suitable output device such as a web page, printer, or some other medium, i.e., a presentation portion 30.

Figure 2:
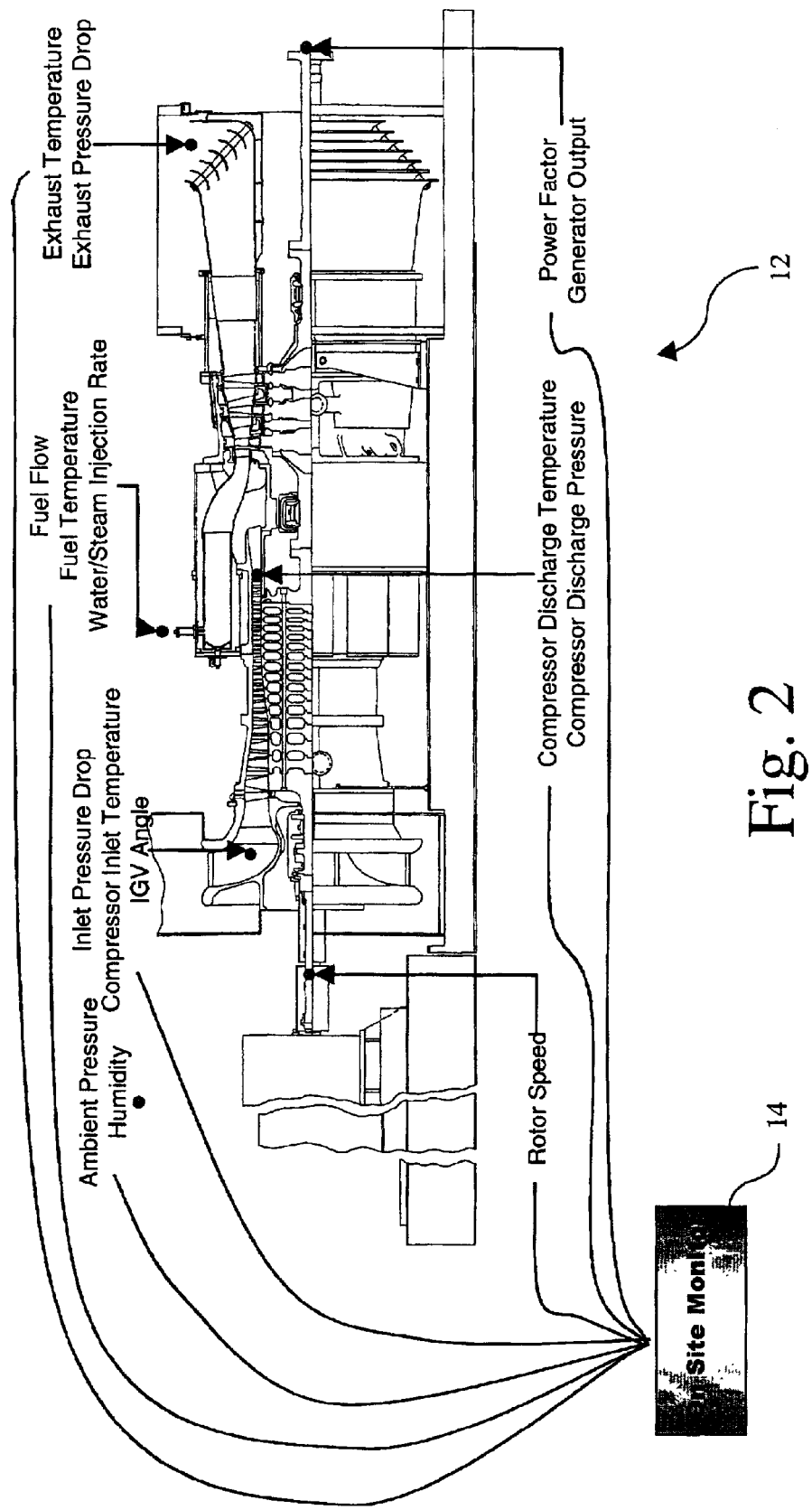
FIG. 2 is a block diagram showing in further detail a turbine and a corresponding "on site monitor" of FIG. 1 in accordance with one embodiment of the invention.

It should be appreciated that the raw data database 22 may input any of a wide variety of data from the turbines 12. In further illustration of this aspect of the invention, FIG. 2 is a schematic diagram illustrative of possible input data That is, FIG. 2 is a schematic diagram showing in further detail a turbine 12 and an "on site monitor" of FIG. 1. As shown in FIG. 2, various sensors are disposed upon and around the turbine 12. These sensors input information data which might be characterized as input data, i.e., "raw data." The input data or raw data may illustratively include ambient pressure and humidity; turbine inlet pressure drop, compressor inlet temperature, and IGV angle; fuel flow, fuel temperature and water/steam injection rate; as well as exhaust temperature and exhaust pressure drop. Sensors on and around the turbine may further input rotor speed of the turbine; compressor discharge temperature and compressor discharge pressure, as well as power factor of the turbine and the generator output of the turbine. However, any other parameter of the turbine, in addition to those mentioned herein, may be utilized in the invention. Further, any suitable sensor may be utilized to provide data regarding the operation of a turbine, as desired.

This various data is obtained from the turbine 12, by the monitor 14, and output to the processing system 20. In accordance with one embodiment of the invention, this data is then used to calculate the "performance data" of the particular turbine, as described in further detail below. As used herein, performance data is data that shows performance parameters of a turbine.

One type of performance data might involve a determination of the operating situation of a particular turbine. To explain, a turbine may be characterized, for example, as having different duty classifications. That is, a turbine may be characterized as having a "base" duty or a "peak" duty cycle, for example. A turbine characterized as a "base" duty turbine operates more or less continuously. In contrast, a turbine characterized as a "peak" duty turbine operates only on selected occasions. For example, such selected occasions might be when the price of electricity is particularly high. As described below, it may be beneficial to process base duty turbines with other base duty turbines, as well as peak turbines with other peak duty turbines, for example.

It should be appreciated that the raw data, which is input from the turbine 12, is not always accurately indicative of the actual conditions in the turbine 12. For example, it may be difficult to position a sensor in an area of the turbine such that a desired condition is monitored. Accordingly, such a sensor may input inaccurate data. Further, a sensor might degrade over a period of time so that the sensor inputs inaccurate information. Any of a variety of other circumstances may result in a sensor on a turbine generating inaccurate data. In accordance with one aspect of the invention, the method determines the validity of data obtained from the turbine, as described below. Operating in an automated fashion, data that is determined to be inaccurate may still be utilized in the processing, but utilized in a limited manner.

Further, it should be appreciated that the quantity, as well as the quality of the data from the turbine may be limited. For example, a situation may develop in which a sensor on the turbine is not operating. In the situation, the system and method of the invention overcomes this lack of data in an automated manner.

In the processing system 20, the raw data that is input is processed so as to generate calculated performance data. This processing involves a variety of steps, as described below. However, the quality or quantity of the raw data may not allow complete processing of the raw data. In this situation, processing of the data obtained from a turbine or a number of turbines is terminated. This termination of the processing is accompanied by capturing what is determinable about the data, i.e., based on the processing that has been performed. Further aspects of such processing are described below in conjunction with FIG. 3.

As described above, the system and method of the invention may use any of a wide variety of raw or input data obtained from sensors on a turbine of interest. The data generated by a particular sensor may be associated with a particular "tag." The tag simply identifies from which sensor the data is obtained, i.e., a tag is the name of a measured parameter. As used herein, a "sensor" is any device, mechanism or arrangement, for example, that obtains information from a turbine and stores or transmits that information in the form of data, i.e., input data as characterized herein.

Further, the various tags obtained from a turbine are then processed using "metrics" as desired. A metric may be characterized as an applied processing of the data or a measurement to be applied against the data. In other words, a metric might be characterized as a validation measurement. A metric might be data quality, data validity, or data availability, for example.

Figure 3:
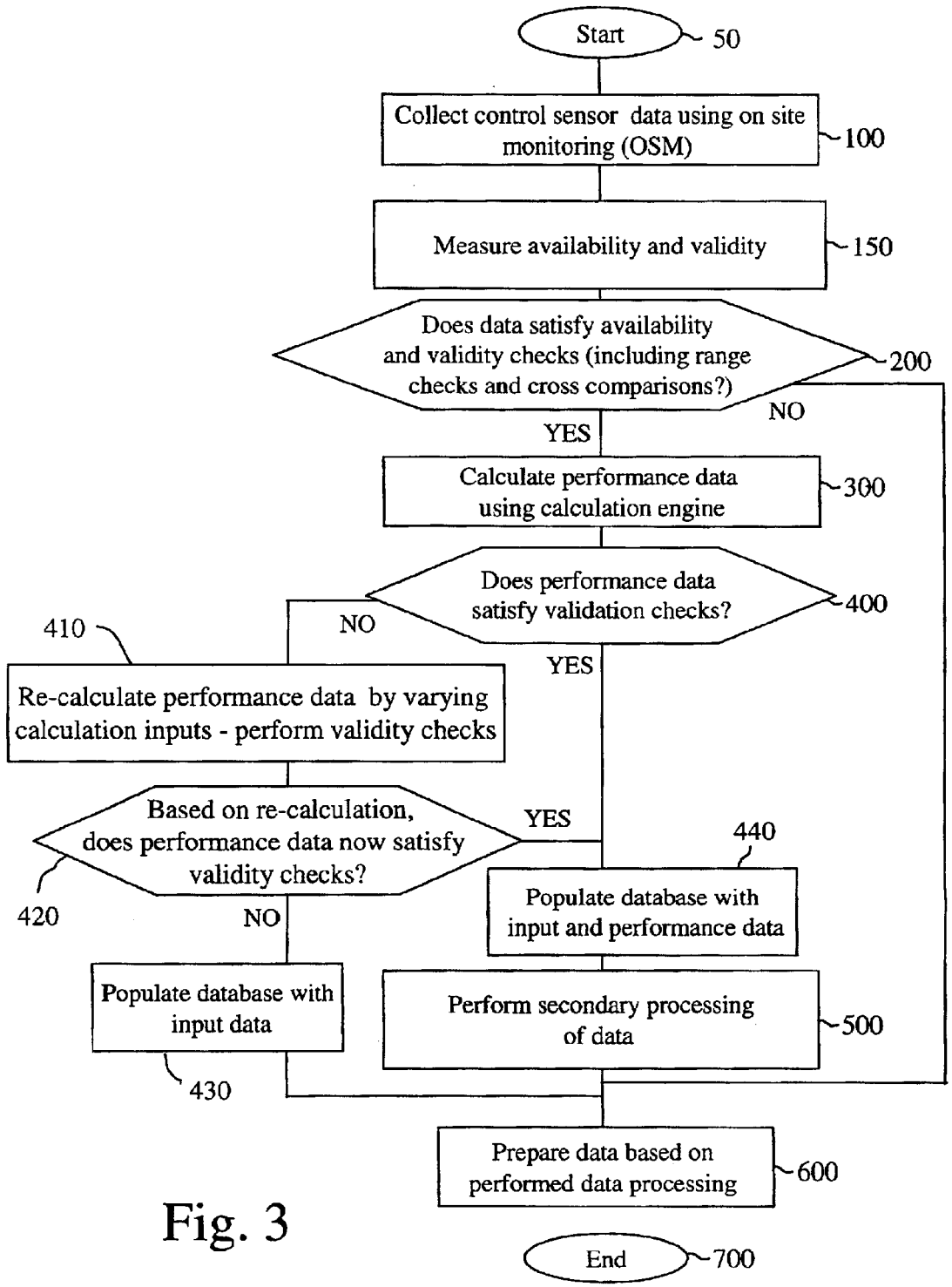
FIG. 3 is a flow chart showing a data monitoring process in accordance with one embodiment of the invention.

FIG. 3 is a flow chart showing a data monitoring process in accordance with one embodiment of the invention. The process of FIG. 3 may be performed using the turbine monitoring system 10 including the processing system 20, or some other suitable operating system. Accordingly, for purposes of illustration, the process will hereinafter be described in conjunction with the turbine monitoring system 10.

As shown in FIG. 3, the process starts in step 50. Then, the process passes to step 100. In step 100, control sensor data from the turbine 12 is collected using the on site monitor (OSM) 14. Then, the process passes to step 150. In step 150, the availability of the data is determined. Further, an initial determination of the validity of the data is determined. Then, the process passes to step 200.

In step 200 in accordance with one embodiment of the invention, the process determines whether the obtained data satisfies the needed availability and validity requirements, including range checks and cross comparisons. This processing may be performed by the data validation portion 24, as shown in FIG. 1. That is, a variety of sensor measurements are deemed to be required to determine turbine unit performance. These particular required measurements may be deemed to be required based on any of a variety of factors, as desired Further, each of the required sensor measurements is range checked to determine if such measurement falls within reasonable limits. Further, some measurements are cross-checked with the input from other sensors. This cross checking may be based on known relationships between the various inputs, i.e., a zero fuel flow may not be accompanied by a normal operational generator output, for example.

In step 200, it should be appreciated that the data may not satisfy the availability and/or the validity checks, including range checks and/or the cross comparisons, i.e., a NO determination may be found in step 200. If a NO determination is found in step 200, the process passes to step 600. In step 600, the data is prepared in some suitable manner based on the performed data processing. For example, the checking of step 200 may have revealed that the data is so lacking that the data should simply be discarded in step 600. Alternatively, the checking of step 200 may reveal that the raw input data is of interest, i.e., so as to warrant retainment of the data, but lacking to a sufficient extent that no further processing may be performed upon the data. In this situation, the raw data may simply be reported in some suitable manner so as to accurately reflect the nature of the data.

Alternatively, the data may satisfy the range checks and cross comparisons of step 200, i.e., yes in step 200. Then, as shown in FIG. 3, the process passes to step 300. In step 300, the calculation engine 25 processes the validated input data and determines unit performance characteristics, i.e., such as output of the turbine, heat rate, as well as other parameters, for example. After step 300, the process passes to step 400.

In step 400, the data validation portion 24, in the processing system 20, determines whether the calculated performance characteristics satisfy validation checks. That is, the resulting performance data, which was generated in step 300, is validated in some suitable-manner. In accordance with one embodiment of the invention, the performance data is validated by verifying the heat balance of the turbine. Any performance data that fails this validation is discarded. In the decision step 400, if a sufficient level of performance data does not satisfy the validation checks, then the process passes to step 410.

In accordance with one embodiment of the invention, in step 410, the processing system 20 has determined that the performance data that did not satisfy the validation checks. Further, the processing system 20 determines, in step 410, which input data, i.e., raw data from the monitor 14, was used to calculate the particular piece of performance data. The calculation engine 25, in accordance with this embodiment of the invention, then determines if the desired piece of calculated performance data might be obtained by using different input data. That is for example, it might be the situation that "inlet pressure drop" was used in the calculation of the piece of performance data. However, the data validation portion 24 may determine, through some suitable manner, that the validity of the "inlet pressure drop" is questionable.

Accordingly as an alternative approach, the calculation engine may then recalculate that same piece of desired performance data, while avoiding the use of the questionable input data, for example the "inlet pressure drop." In the process of such a recalculation, the calculation engine 25 might calculate an estimated "input data" for an input data that was deemed questionable, i.e. for example, the calculation engine 25 might calculate an estimated inlet pressure drop. The calculation engine 25 may then compare this estimated inlet pressure drop with the actual measured inlet pressure drop. This comparison may then be used, to some extent, to validate the estimated input data.

To further explain, it should be appreciated that input or raw data obtained from a turbine may be processed in a wide variety of ways using a wide variety of calculations. For example, various aspects of thermodynamics may be used in such calculations. Further, it should be appreciated that a particular piece of performance data, i.e., information that has been generated based on the input data, may often be calculated using different input data or estimations of input data, for example. Illustratively, ambient temperature might be measured by an ambient temperature sensor, or alternatively, by measuring other parameters and estimating ambient temperature. Either measurement might be used to determine the ambient temperature. The processing system 20 including the calculation engine 25, for example, is provided with a variety of processing schemes to generate desired information. Further, the calculation engine 25, in accordance with one embodiment of the invention, can automatically switch processing schemes depending on the calculation engine's processing of the input data and the performance data.

Illustratively using the above example of ambient temperature, it may be determined that, in general, a more accurate measurement is to actually measure the ambient temperature directly using a sensor. Accordingly, the calculation engine 25 might primarily use the ambient temperature sensor to measure ambient temperature. Further, the calculation engine 25 may compare the measured ambient temperature to an expected band of values. That is, the calculation engine 25 knows that the ambient temperature should be in an expected band or window of values. However, during operation on a particular day, the calculation engine 25 becomes aware, in an automated fashion, the ambient temperature from the ambient temperature sensor is not available, i.e., "null" or the measured ambient temperature fails to meet the validation requirements, i.e., the measured ambient temperature is not within the band of expected values. Thus, the calculation engine 25, in accordance with one illustrative example of the invention, will switch processing schemes, i.e., the calculation engine 25 will use an estimation, i.e., a backup value, of ambient temperature based on other sensors, rather than the ambient temperature sensor itself. Illustratively, the backup value for ambient temperature might be determined using compressor discharge pressure, compressor pressure ratio, and inlet pressure drop.

This determination might be done using the relationship:

$$AFPAP\_PSIA\_CALC = ([CPD] + [CPR]*[AFPCS]* 0.03613)/([CPR]-1)$$

where:
AFPAP_PSIA_CALC=the replacement value of ambient pressure;
CPD=Compressor Discharge Pressure;
AFPCS=Inlet Pressure Drop;
CPR=Compressor Pressure Ratio; and
0.0361 is a conversion factor from inches of water (the units on inlet pressure drop) to pounds per square inch (the units of ambient pressure).

Based on this determination of ambient temperature, the calculation engine 25 obtains a different value for the ambient temperature. Further, this different value for the ambient temperature flow does indeed fall within the "window" of expected values in this example. Accordingly, the calculation engine 25 continues to use the measurement of ambient temperature based on the other sensors. Further, in some period of time, the calculation engine 25 might again try to use the ambient temperature sensor, for example in fifteen minutes. At that point the calculation engine 25 might again proceed with continued use of the ambient temperature sensor, if the measured ambient temperature falls within the "window" of expected ambient temperature values.

In other words, the above described aspect of the invention might be characterized as: the processing of the input data to generate performance data includes determining an invalidity of a first utilized calculation, i.e., the measured ambient temperature from the ambient temperature sensor; determining the validity of a second utilized calculation (the calculated ambient temperature); and using the second calculation in substitution for the first utilized calculation to generate the verified performance data. Further, as noted above, the first utilized calculation might then be again tried at some later time.

In further explanation of data validation and the process of FIG. 3, fuel flow provides an illustrative example. The fuel flow may be calculated based on a thermodynamic energy balance of the gas turbine. Further, the fuel flow may be measured directly. The "calculated" fuel flow is then compared to the measured fuel flow and if the calculated fuel flow is within a certain percentage (%) of the measured value, the "calculated" value is used, i.e., the measured fuel flow is used as a "goodness-of-fit" parameter for the calculated value. If the measured fuel flow and the calculated fuel flow don't agree within a specified tolerance, the output data is discarded and only the input data is saved.

With further reference to FIG. 3, after step 410, the process passes to step 420. In step 420, the data validation portion 24 determines whether, based on the recalculation, the calculated performance data now satisfies the applicable validity checks? If YES, then the now validated performance data is utilized in the processing of step 440, discussed below. Alternatively, the calculated performance data may still not satisfy the applicable validity checks. As a result, the process passes to step 430.

In step 430, the data mart portion 28, or some other suitable database, is populated with only the input data obtained from the on site monitor 14, i.e., no performance data is used. Rather, as noted above, the performance data is discarded. Then, after step 430, the process passes to step 600. In step 600, any remaining processing, such as preparing the input data for presentation on the presentation portion 30, for example, is performed.

Alternatively, some or all of the performance data calculated in step 300 may indeed satisfy the validation checks of step 400. As a result, the process passes from step 400 to step 440. In step 440, the data mart portion 28 is populated with both validated input data and the calculated performance data, i.e., verified performance data. As used herein, "verified performance data" means data, that is obtained from input data, that is of sufficient value to either store or display, for example. After step 440, the process passes to step 500. In step 500, secondary processing is performed on the data. Further details of step 500 are described below in conjunction with FIG. 4.

After step 500, the process passes to step 600. As described above, in step 600, any remaining processing, such as preparing the input data for presentation on the presentation portion 30, is performed on the input data and the performance data.

As described above, various processing steps lead to the processing of step 600. After step 600, the process passes to step 700. In step 700, the process ends. That is, the "process ends" means that the processing system 20 may then move on to processing data for another turbine, or alternatively, to processing a different data set for the same turbine, for example.

Figure 4:
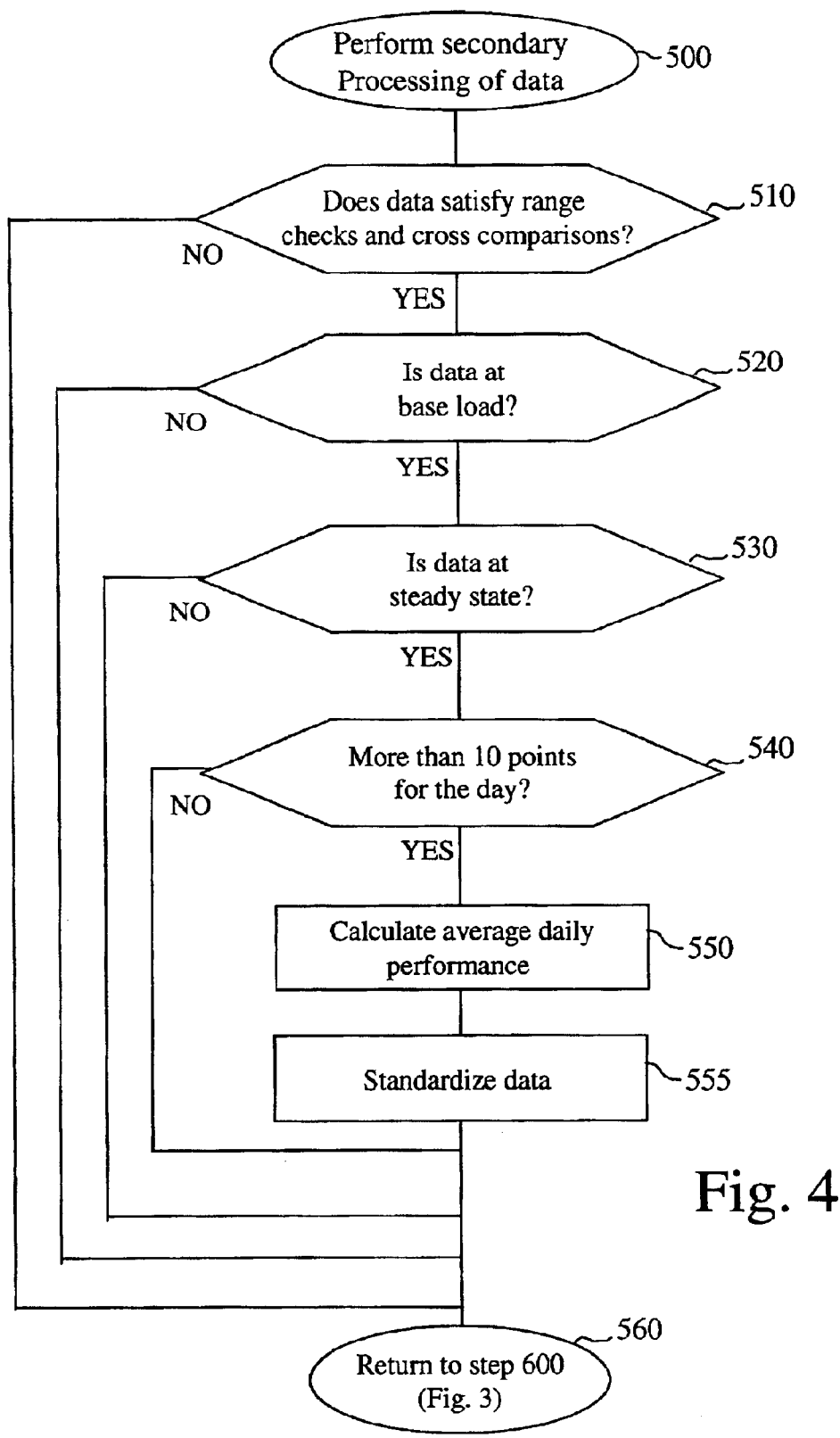
FIG. 4 is a flow chart showing in further detail the "perform secondary processing of data" step of FIG. 3 in accordance with one embodiment of the invention.

FIG. 4 is a flow chart showing in further detail the perform secondary processing of data step of FIG. 3 in accordance with one embodiment of the invention. As shown in FIG. 4, the subprocess starts in step 500. Then, the process passes to step 510. In step 510, the data validation portion 24 performs additional range checks and cross checks on the data. These remaining range checks and cross-checks may vary as desired depending on the particular turbine and the particular objectives of testing, for example. As shown in FIG. 4, if the data fails these additional checks in step 510, no other calculations are made and the process passes to step 560. In step 560, the process returns to step 600 (FIG. 4), as described above.

Alternatively, the data may satisfy the range checks and cross checks of step 510. As a result, the process passes to step 520. In step 520 of FIG. 4, the performance data is checked to determine if the performance data was taken at base load. This might be performed by inspecting the IGV (inlet guide vane) angle and exhaust temperature of the turbine, for example. A base load indicator switch is set for those points determined to be operating at base load. That is, for the data that is determined to be obtained during base load, a suitable "flag" is set, i.e., to 1 or 0 for example, to so designate the data. Using this approach, all data, i.e., different data sets, that are obtained during base load may be compared or processed as desired. It should be appreciated that comparison of only base load data, as compared to data obtained during a non-base load condition, may yield better results in performing some calculations. In other words, it may be beneficial to compare or process data from different turbines that are operating under similar conditions, such as a base load condition or a steady state condition discussed below, for example.

If the performance data is determined to not be taken at the base load, in accordance with this embodiment of the invention, then the process again passes to step 560, as described above.

Alternatively, in step 520, the performance data may indeed be determined to be taken at base load. As a result, the process of FIG. 4 passes to step 530. In step 530, the performance data is further checked to determine if the performance data was taken during thermally stable, steady state operation. This checking may be done by inspecting the variation of some key measurement indicators. These measurement indicators may be wheelspace temperatures, for example, or a temperature reading from any other portion of the turbine assembly, as desired. A steady state indicator switch is set for those points determined to be thermally stable. That is, for the data that is determined to be obtained during steady state, a suitable "flag" is set, i.e., to 1 or 0 for example, to so designate the data. Using this approach, all data, i.e., different data sets, that are obtained during steady state may be compared or processed as desired. It should be appreciated that comparison of only steady state data, as compared to data obtained during a non-steady state condition, may yield better results in performing some calculations.

As described above, it may be beneficial to compare or process data from different turbines that are operating under similar conditions, such as a base load condition or a steady state condition. Relatedly, it may be desired to "standardize" input data or performance data obtained from different turbines. To explain, exhaust temperature, for example, might be used by the calculation engine 25 in a calculation. The exhaust temperature may well be lower on a 20 degree Fahrenheit day than on a 95 degree Fahrenheit day, while holding the other operating parameters the same. Accordingly, the calculation engine 25 may standardize both the 20 degree day and the 95 degree day to the exhaust temperature of a 59 degree Fahrenheit day, based on obtained relationships of ambient temperature to exhaust temperature for that turbine. Further, the calculation engine 25 may standardize another turbine, which is operating in a 10 degree Fahrenheit temperature, to the same 59 degrees. In this manner, the operation of various turbines may be effectively compared.

With further reference to FIG. 4, if the performance data is determined to not be taken at steady state, in accordance with this embodiment of the invention, then the process again passes to step 560, as described above.

Alternatively, in step 530, the performance data may indeed be determined to be taken at steady state. As a result, the process of FIG. 4 passes to step 540. That is, in accordance with this embodiment of the invention, it is desired to calculate an average daily performance. However, before the daily average performance can be calculated, the number of steady state base load points are counted in step 540. That is, the number of steady state base load points are counted to make sure there are enough to calculate a reliable average. For example, ten steady state base load points may be deemed the minimum needed to calculate an average daily performance. If a sufficient number of points is not present in step 540, in accordance with this embodiment of the invention, then the process again passes to step 560, as described above.

Alternatively, in step 540, the processing system 20 may determine that a sufficient number of steady state base load points are present. As a result, the process passes to step 550. In step 550, all data from the day, for example, that has been validated and determined to be steady state, base load is used to calculate the daily average performance. The date at which this data was stored is recorded in a time stamp. In accordance with one embodiment of the invention, each night, the data of the previous day, along with any desired time stamping, is uploaded into the data mart portion 28. Thereafter, the uploaded data in the data mart portion 28 may be accessed by the presentation portion 30, for example. After step 550, the process passes to step 555.

In step 555, the data is standardized, in accordance with one embodiment of the invention. That is, any of the input data or the performance data may be standardized, as described above, such that turbines operating under different conditions may be effectively compared. Those skilled in the art are capable of standardizing the various input data and performance data based on the teachings herein. After step 555, the process passes to step 560 and returns to step 600, as described above.

As described above and as illustrated by FIGS. 3 and 4, the system and method of the invention provide, in accordance with one aspect of the invention, that input data and performance data may be progressively further processed depending on the availability and validity of the data. This results in effectively and accurately providing as much data to a user as possible. That is, once the process of the invention determines that the validity and/or availability of the data does not permit or warrant further processing, the process is stopped and the results, which have been obtained in the processing, displayed. Illustratively, if the input data is not sufficiently valid, then performance data might not be calculated. However, the input data might still be displayed.

As described above in conjunction with illustrative FIGS. 3 and 4, a particular sequence of steps are used in the processing of data. That is, performance calculations are shown in FIGS. 3 and 4 as being performed before calculating base load and steady state. However, the system and method of the invention are not limited to such order. Rather, the order of some or all of the steps of FIGS. 3 and 4 might be varied as desired. Accordingly, performing a check for steady state and/or base load could be done before performance calculation, for example.

It should be appreciated that data, including input data and performance data, that is used in the various embodiments of the invention may be "all" of the data obtained from a turbine, or alternatively, may be only a "portion" of the data obtained from a turbine. That is, the process of FIGS. 3 and 4 might be performed on all or part of the data that is obtained at a particular time or over a period of time. Further, in accordance with one embodiment of the invention, data, that is obtained from a turbine at a particular time for example, might be separately processed using the methods of the invention. For example, a part of the data might be valid and another part not valid. Accordingly, the valid part might be used to generate performance data, to the extent possible, whereas the not valid data will not be used to generate performance data.

The system and method of the invention provide for the effective use of operation data by entities that monitor turbines or end users, for example, including a seller, manufacturer, or an external customer of turbine equipment. Further, the system and method of the invention may be used to provide unit performance data for any of a wide variety of gas turbines. This data may be provided in the form of a direct online customer sales interface, as described above. The invention provides the ability to quickly check the operation of a unit in the field and determine performance changes over time. This allows better diagnoses of field issues and enhanced capability to answer customer inquiries.

The collected data may be used to monitor the performance of the gas turbine fleet, including any of a wide variety or operating parameters, such as the firing temperature, for example. Illustratively, firing temperature may be used to calculate performance guarantees. That is, a better understanding of unit firing temperature reduces risk associated with making performance guarantees. As should be appreciated, this in turn improves customer satisfaction. The invention may also be used to track unit deterioration over time and predict fleet deterioration rates. Other obtained operating parameters may also be used to enhance customer satisfaction and in general the ability to operate turbines in the field.

As described herein, the system and method of the invention may utilize any suitable application program, a collection of separate application programs, a module of a program, or a portion of a module of a program, for example to perform the various processing as described herein. It should be appreciated that the computer language used in the system and method of the invention may be any of a wide variety of programming languages. Further, it is not necessary that a single programming language be utilized in conjunction with the operation of the system and method of the invention. Rather, any number of different programming languages may be utilized as is necessary or desirable.

As described above, the system and method of the invention utilize a data presentation portion that provides a user interface. As used in various embodiments of the invention, the user interface may be in the form of, but is not limited to, any software, hardware or combination of hardware and software used in an operating system that allows a user to interact with the operating system. Thus, a user interface may include any of a display screen, touch screen, keyboard, mouse, voice reader, voice recognizer, dialogue screen, menu box, a list, a checkbox, a toggle switch, a pushbutton or any other object that allows a user to receive information regarding the operation of the program and/or provide the operating system with information. Accordingly, the user interface is any device that provides communication between a user and a computer. The information provided by the user to the computer through the user interface may be in the form of a command, a selection or data, or other input, for example.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure, which includes the attachments, is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

What is claimed is:

1. A method for remotely monitoring the operation of at least one turbine, the turbine in an operating location, the method comprising:
   inputting input data from the turbine;
   processing the input data to generate verified performance data, the processing including determining validity of the input data and performing at least one calculation on the input data, which is valid, to generate the verified performance data; and
   generating a collection of stored data in a database based on at least one of the input data and the verified performance data; and
   wherein processing the input data to generate verified performance data includes calculating an average daily performance of the turbine.

2. The method of claim 1, wherein the step of processing the input data to generate verified performance data includes determining if input data is available.

3. The method of claim 1, wherein the step of processing the input data to generate verified performance data includes at least one of range checks and cross comparisons on the input data.

4. The method of claim 1, wherein generating a collection of stored data in a database based on at least one of the input data and the verified performance data includes generating the collection of stored data based only on the input data, if the input data is determined to be not valid.

5. The method of claim 1, wherein generating a collection of stored data in a database based on at least one of the input data and the verified performance data includes generating the collection of stored data biased on the input data and the performance data, if the input data is determined to be valid.

6. The method of claim 1, wherein processing the input data to generate verified performance data includes:
  processing the input data to determine calculated performance data; and
  determining the validity of the calculated performance data; and
  designating valid calculated performance data as verified performance data.

7. The method of claim 6, wherein determining the validity of the calculated performance data includes performing range checks and cross comparisons on the calculated performance data.

8. The method of claim 6, wherein determining time validity of the calculated performance data includes determining a base load condition of turbine.

9. The method of claim 6, wherein determining the validity of the calculated performance data includes determining a steady state condition of the turbine.

10. The method of claim 1, wherein the at least one turbine is at least one gas turbine.

11. A method for remotely moritoring the operation of at least one turbine, the turbine in an operating location, the method comprising:
  inputting input data from the turbine;
  processing the input data to generate verified performance data, the processing including determining validity of the input data and performing at least one calculation on the input data, which is valid, to generate the verified performance data; and
  generating a collection of stored data in a database based on at least one of the input data and the verified performance data; and
  wherein the processing the input data to generate verified performance data includes;
    determining an invalidity of a first utilized calculation;
    determining the validity of a second utilized calculation; and
  using the second calculation in substitution for the first utilized calculation to generate the verified performance data.

12. The method of claim 11, wherein the at least one turbine is a plurality of turbines.

13. The method of claim 12, wherein at least one of the input data and the verified performance data are standardized for each of the plurality of turbines.

14. The method of claim 11, wherein the step of processing the input data to generate verified performance data includes stopping the processing once input data or processed data, which is obtained from the input data, is determined to be invalid; and
  wherein generating a collection of stored data includes displaying at least one of the input data and the verified performance data that is obtained prior to the stopping.

15. A system for remotely monitoring the operation of at least one turbine, the turbine in an operating location, the system comprising:
  a database for inputting input data from the turbine;
  a processing system that processes the input data to generate verified performance data, the processing system including:
    a data validation portion that determines validity of the input data;
    a calculation engine that performs an least one calculation on the input data, which as valid, to generate the verified performance data; and
    a presentation portion that accesses a data storage portion to display a collection of stored data that is stored in the data storage portion, wherein the stored data as based on at least one of the input data and the verified performance data; and
  wherein the processing portion:
    determines an invalidity of a first utilized calculation;
    determines the validity of a second utilized calculation; and
    wherein the calculation engine uses the second calculation in substitution for the first utilized calculation to generate the verified performance data.

16. The system of claim 15, wherein the data validation portion performs at least one of range checks and cross comparisons on the input data.

17. The system of claim 15, wherein the at least one turbine is at least one gas turbine.

18. The system of claim 15, wherein the processing system stops processing once the input data or processed data, which is obtained from the input data, is determined to be invalid; and
  the presentation portion displays at least one of the input data and the verified performance data that is obtained prior to the stopping.

19. A method for remotely monitoring the operation of at least one gas turbine, the gas turbine in an operating location, the method comprising:
  inputting input data from the gas turbine;
  processing the input data to generate vitrified performance data, the processing including determining validity of the input data and performing as least one calculation on the input data, which is valid, to generate the verified performance data; and
  generating a collection of stored data in a database based on at least one of the input data and the verified performance data; and
  wherein determining the validity of the calculated performance data includes determining a base load condition of the turbine;
  wherein determining the validity of the calculated performance data includes determining a steady state condition of the turbine;
  wherein the step of processing the input data to generate verified performance data includes stopping the processing once input data or processed date, which is obtained from the input data, is determined to be invalid; and
  generating a collection of stored data includes displaying at least one of the input data and the verified performance data that is obtained prior to the stopping; and
  wherein the processing the input data to generate verified performance data further includes:
    determining an invalidity of a firm utilized calculation;
    determining the validity of a second utilized calculation; and
    using the second calculation in substitution for the first utilized calculation to generate verified performance data.

20. An automated system for remotely monitoring the operation of at least one gas turbine, the gas turbine in an operating location, the system comprising:
  a database for inputting input data from the turbine;

a processing system that processes the input data to generate verified performance data, the processing system including:
  a data validation portion that determines validity of the input data, the data validation portion performs at least one of range checks and cross comparisons on the input data;
  a calculation engine that performs at least one calculation on the input data, which is valid, to generate the verified performance data; and
  a presentation portion that accesses a data storage portion to display a collection of stored data that is stored in the data storage portion, wherein the stored data is based on at least one of the input data and the verified performance data; and
wherein the processing system stops processing once the input data or processed data, which is obtained from the input data, is determined to be invalid; and
the presentation displays at least one of the input data and the verified performance data that is obtained prior to the stopping; and
wherein the processing portion:
  determines an invalidity of a first utilized calculation;
  determines the validity of a second utilized calculation; and
  wherein the calculation engine uses the second calculation in substitution for the first utilized calculation to generate the verified performance data.

21. A system for remotely monitoring the operation of at least one gas turbine, the gas turbine in an operating location, the system comprising:
  means for inputting input data from the gas turbine;
  means for processing the input data to generate verified performance data, the means for processing determining validity of the input data and performing at least one calculation on the input data, which is valid, to generate the verified performance data; and
  means for generating a collection of stored data in a database based on at least one of the input data and the verified performance data; and
  wherein the means for determining the validity of the calculated performance data determines a base load condition of the turbine;
  wherein the means for determining the validity of the calculated performance data determines a steady state condition of the turbine;
  wherein the means for processing the input data to generate verified performance data stops the processing once input data or processed data, which is obtained from the input data, is determined to be invalid; and
  the means for generating a collection of stored data displays at least one of the input data and the verified performance data chat is obtained prior to the stopping; and
  wherein the means for processing the input data to generate verified performance data:
    determines an invalidity of a first utilized calculation;
    determines the validity of a second utilized calculation; and
    uses the second calculation in substitution for the first utilized calculation to generate the verified performance data.

* * * * *